United States Patent
MacIsaac

(10) Patent No.: US 8,180,026 B2
(45) Date of Patent: May 15, 2012

(54) METHOD AND APPARATUS FOR MANAGING A CALL

(75) Inventor: Brian Joseph MacIsaac, Kanata (CA)

(73) Assignee: Mitel Networks Corporation, Ottawa (CA)

( * ) Notice: Subject to any disclaimer, the term of this patent is extended or adjusted under 35 U.S.C. 154(b) by 1251 days.

(21) Appl. No.: 11/770,407

(22) Filed: Jun. 28, 2007

(65) Prior Publication Data

US 2009/0003551 A1  Jan. 1, 2009

(51) Int. Cl.
  *H04M 11/00* (2006.01)
  *H04W 36/00* (2009.01)

(52) U.S. Cl. .......... 379/88.21; 370/352; 370/389; 370/462; 379/88.13; 379/217.01; 379/221.13; 379/265.01; 379/266.01; 455/412.1; 455/417; 455/426.1; 455/432.3; 455/439; 709/220; 715/816

(58) Field of Classification Search .......... 370/352, 370/462, 389; 379/88.21, 88.22, 201.1, 211.02, 379/220.01, 221.13, 88.23, 114.29, 207.2, 379/265.02, 88.13, 207.02, 211.03, 217.01, 379/221.08, 265.01, 266.01, 266.04; 455/412.1, 455/414.1, 417, 426.1, 432.3, 436, 439; 709/220; 715/816
See application file for complete search history.

(56) References Cited

U.S. PATENT DOCUMENTS

| | | | | |
|---|---|---|---|---|
| 5,754,627 A * | 5/1998 | Butler et al. | ............. | 455/414.1 |
| 5,839,067 A * | 11/1998 | Jonsson | ............. | 455/432.3 |
| 5,933,488 A * | 8/1999 | Marcus et al. | ............. | 379/217.01 |
| 6,044,144 A * | 3/2000 | Becker et al. | ............. | 379/265.02 |
| 6,411,805 B1 * | 6/2002 | Becker et al. | ............. | 455/414.1 |
| 6,473,437 B2 * | 10/2002 | Stumer | ............. | 370/462 |
| 6,493,433 B2 * | 12/2002 | Clabaugh et al. | ............. | 379/88.13 |
| 6,526,050 B1 * | 2/2003 | Hebert et al. | ............. | 370/389 |
| 6,650,748 B1 * | 11/2003 | Edwards et al. | ............. | 379/266.04 |
| 6,678,366 B1 * | 1/2004 | Burger et al. | ............. | 379/211.03 |
| 6,697,469 B1 * | 2/2004 | Koster | ............. | 379/114.29 |
| 6,839,422 B2 * | 1/2005 | Williams et al. | ............. | 379/221.08 |
| 6,868,152 B2 * | 3/2005 | Statham et al. | ............. | 379/265.02 |
| 6,895,237 B1 * | 5/2005 | Scott | ............. | 455/414.1 |
| 6,975,709 B2 * | 12/2005 | Wullert, II | ............. | 379/88.23 |
| 7,068,641 B1 * | 6/2006 | Allan et al. | ............. | 370/352 |
| 7,110,748 B2 * | 9/2006 | Murphy et al. | ............. | 455/412.1 |
| 7,283,823 B2 * | 10/2007 | Pearce et al. | ............. | 455/439 |
| 7,539,492 B2 * | 5/2009 | Jagadeesan et al. | ............. | 455/436 |
| 7,616,749 B2 * | 11/2009 | Poustchi | ............. | 379/211.02 |
| 7,627,656 B1 * | 12/2009 | Anand et al. | ............. | 709/220 |
| 7,636,431 B2 * | 12/2009 | Williams et al. | ............. | 379/221.13 |
| 7,653,191 B1 * | 1/2010 | Glasser et al. | ............. | 379/201.1 |

(Continued)

FOREIGN PATENT DOCUMENTS

WO  WO 96/12378  4/1996

*Primary Examiner* — Gerald Gauthier

(57) ABSTRACT

According to embodiments described in the specification, a method and apparatus for managing a call to a user associated with a destination communications device, the call initiated by a caller at an originating communications device, is described. An indication of the call is received, the indication of the call comprising data associated with the user. A state of the user is determined by processing the data associated with the user and consulting a record of the state of the user. The call is parked if the state of the user comprises a delayed answer state, the delayed answer state comprising the user being available to receive the call, but requiring additional time to retrieve the call using the destination communications device, and a notification of the call is triggered at the destination communications device by transmitting a signal to the address of the communications device.

17 Claims, 3 Drawing Sheets

U.S. PATENT DOCUMENTS

| | | |
|---|---|---|
| 7,688,807 B2 * | 3/2010 | Yegoshin ................ 370/352 |
| 7,756,514 B2 * | 7/2010 | Muratore et al. ............ 455/417 |
| 7,764,960 B2 * | 7/2010 | McClung ................ 455/426.1 |
| 7,848,510 B2 * | 12/2010 | Shaffer et al. ............ 379/266.01 |
| 7,941,762 B1 * | 5/2011 | Tovino et al. ................ 715/816 |
| 7,970,117 B2 * | 6/2011 | Shaffer et al. ............ 379/265.01 |
| 2003/0215078 A1 | 11/2003 | Brahm |
| 2004/0203632 A1 * | 10/2004 | Schaaf ................ 455/414.1 |
| 2004/0240656 A1 * | 12/2004 | Poustchi ................ 379/220.01 |
| 2005/0008129 A1 | 1/2005 | Wullert |
| 2005/0096023 A1 | 5/2005 | Moore |
| 2005/0213740 A1 | 9/2005 | Williams |
| 2006/0045240 A1 * | 3/2006 | Buchner ................ 379/67.1 |
| 2008/0112555 A1 * | 5/2008 | Johns ................ 379/207.02 |
| 2009/0003551 A1 * | 1/2009 | MacIsaac ................ 379/88.21 |
| 2010/0172483 A1 * | 7/2010 | Weiner ................ 379/211.02 |
| 2010/0183127 A1 * | 7/2010 | Uy et al. ................ 379/88.22 |

\* cited by examiner

METHOD AND APPARATUS FOR MANAGING A CALL

FIELD

The specification relates generally to communications systems, and specifically to a method and apparatus for managing a call.

BACKGROUND

Speaking on cell phones while driving can be a dangerous practise, leading to increased accident rates. So much so, that many governments have banned cell phone use while driving, or are considering such bans. While the use of a hands free kit can facilitate cell phone calls while driving, not all drivers have access to a hands free kit. Furthermore, while governments, who otherwise ban the practise, allow the use of a hands free kit to facilitate cell phone use while driving, studies have not shown a discernible difference in accident rates if a driver is using a hands free kit. Hence, many governments are considering banning this practise also.

Nonetheless, it is often disadvantageous for a driver to ignore an incoming call, for example by letting the call go to voicemail, rather than answer the call and risk an accident and/or a fine. For example, a user may be expecting an important business call while being unavoidably on the road. Ignoring the call may damage a business relationship, especially if the caller knows that the user is expecting the call. In a further example, a parent who is on the road may wish to accept all calls from their children (or other family members), as a call from a child may be an emergency.

Other situations may arise where it may be difficult for a user to answer call, or socially unacceptable for the user to do so, but it is also disadvantageous to ignore the call. For example, a user may be in a business meeting or a movie theatre when the call arrives at the cell phone. Furthermore, the situation may not be limited to cell phones. For example, a sales person may be finishing up with a client, while expecting an important call at their desk phone. Or a parent may be bathing a small child, while expecting an important call at their home phone. In either case, the user cannot immediately pick up the call when it arrives.

Hence there is a need for a method and apparatus for managing a call when a user is available to receive the call, but requires additional time to retrieve the call.

SUMMARY

A first broad aspect of an embodiment seeks to provide a method for managing a call to a user associated with a destination communications device, the call initiated by a caller at an originating communications device. In a first step, the method comprises receiving an indication of the call, the indication of the call comprising data associated with the user. In a second step, the method comprises determining a state of the user by processing the data associated with the user and consulting a record of the state of the user. In a third step, the method comprises parking the call if the state of the user comprises a delayed answer state, the delayed answer state comprising the user being available to receive the call, but requiring additional time to retrieve the call using the destination communications device. In a fourth step, the method comprises triggering a notification of the call at the destination communications device by transmitting a signal to the address of the communications device.

In some embodiments of the first broad aspect, parking the call comprises causing the call to be placed on hold. In other embodiments of the first broad aspect, parking the call comprises connecting the call with an audible message system for notifying the caller via the originating communications device that the state of user comprises the delayed answer state. In some of these embodiments, notifying the caller comprises transmitting an audible message to the caller.

In other embodiments of the first broad aspect, the method further comprises receiving an indication of the user attempting to retrieve the call in response to triggering the notification, and triggering the connection of the call between the originating communications device and the destination communications device in response to the indication. In some of these embodiments, triggering the connection of the call comprises transmitting a signal to at least one switching device, the at least one switching device for effecting a connection between the originating communications device and the destination communications device.

In some embodiments of the first broad aspect, the method further comprises determining an address of the destination communications device to effect triggering of the notification, by processing the data associated with the user. In other embodiments of the first broad aspect, the method further comprises determining an address of the destination communications device to effect triggering of the notification, by consulting a record of the location of the user. In some of these embodiments, the record of the state of the user comprises the record of the location of the user.

In other embodiments of the first broad aspect, the notification of the call at the destination communications device comprises at least one of displaying a message on a display unit associated with the destination communications device, playing an audible notifier, and a vibration of the destination communications device. In yet further embodiments of the first broad aspect, the indication of the call further comprises a connection with the originating communications device via at least one switching element that is connected with the originating communications device.

In yet other embodiments of the first broad aspect, the indication of the call further comprises an identifier of the caller, and the method further comprises parking the call if the state of the user comprises the delayed answer state, and the identifier of the caller matches a reference identifier. In some of these embodiments, the identifier of the caller comprises at least one of a caller line ID of the originating communications device, a network address of the originating communications device, and an alias of the caller.

In yet other embodiments of the first broad aspect, the data associated with the user comprises at least one of a phone number of a destination communication device for which the call is initially intended, a network address of said destination communication device for which the call is initially intended, and an alias of the user.

In yet further embodiments of the first broad aspect, the method further comprises triggering the connection of the call between the originating communications device and a voicemail system if an indication of the user attempting to retrieve the call in response to the triggering of the notification is not received within a defined time period In yet further embodiments of the first broad aspect, the method further comprises consulting a record of a current location of the user to determine an address of the destination communications device, a current location of the user associated with the address of the destination communications device. In some of these embodiments, consulting a record of a current location of the user to determine an address of the destination communications device comprises: first transmitting a request for the current location of the user to a presence server, the presence server for storing the record of a current location of the user; receiving the current location of the user in response to the request; and consulting a list of destination communication devices associated with the user using the current location.

In yet further embodiments of the first broad aspect, the method further comprises receiving an access code and parking the call if the state of the user comprises the delayed answer state, and the access code matches a reference access code.

In yet other embodiments of the first broad aspect, the method further comprises receiving an indication of the state of the user from a communications device.

A second broad aspect of an embodiment seeks to provide a computing device for managing a call to a user associated with a destination communications device, the call initiated by a caller at an originating communications device. The computing device comprises a communications interface for receiving an indication of the call, the indication of the call comprising data associated with the user. The computing device further comprises a processor for: determining a state of the user by processing the data associated with the user and consulting a record of the state of the user; parking the call if the state of the user comprises a delayed answer state, the delayed answer state comprising the user being available to receive the call, but requiring additional time to retrieve the call using the destination communications device; and triggering a notification of the call at the destination communications device by transmitting a signal to the address of the communications device via the communications interface.

BRIEF DESCRIPTIONS OF THE DRAWINGS

Embodiments are described with reference to the following figures, in which.

DETAILED DESCRIPTION OF THE EMBODIMENTS

Figure 1:
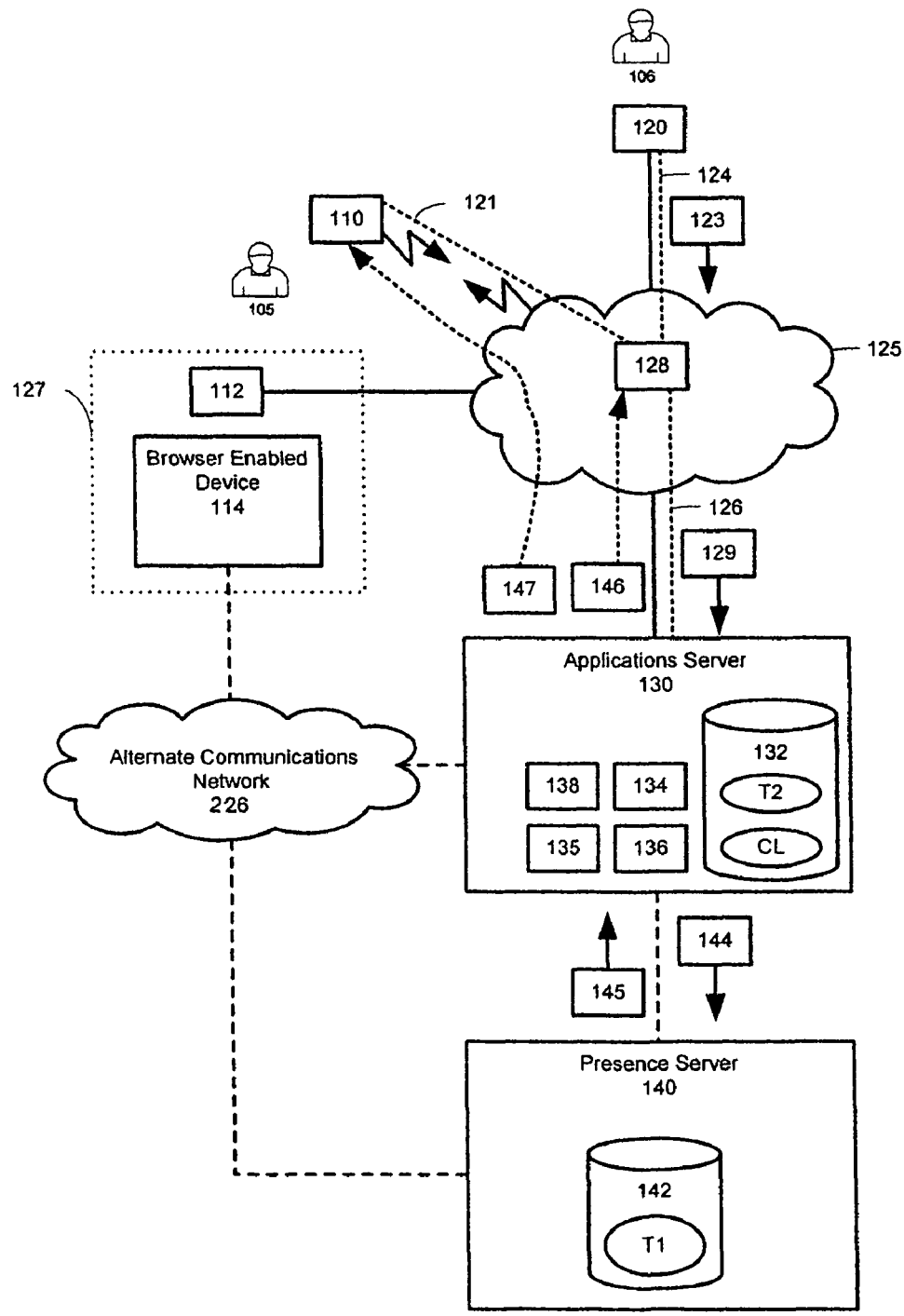
FIG. 1 depicts a system for managing a call from an originating communications device associated with a caller, to a destination communications device associated with a user, according to a non-limiting embodiment.

FIG. 1 depicts a system for managing a call from an originating communications device 120 associated with a caller 106, to a destination communications device associated with a user 105, via a communications network 125. In seine embodiments, the destination communications device comprises a mobile communications device 110, enabled to communicate wirelessly via the communications network 125. In these embodiments, the mobile communications device 110 may comprise a cell phone, a PDA enabled to wirelessly communicate via the communications network 125, a WiFi device, a WiMax device, a VoIP device, a mobile computing device enabled to wirelessly communicate via the communications network 125, another type of wirelessly enabled mobile device, or a combination thereof. In other embodiments, the destination communications device may comprise a wired communications device 112. In these embodiments, the wired communications device 112 may comprise a PSTN phone, a VoIP phone, a computing device comprising a VoIP client and suitable communications elements for communicating via the communications network 125 (e.g. a head phones, Ethernet interface etc.), or a combination thereof. In any event, the mobile communications device 110 and/or the wired communications device 112 are associated with the user 105. In one non-limiting embodiment, the mobile communications device 110 may comprise a cell phone of the user 105, while the wired communications device 112 may comprise a home or office phone of the user 105. In other embodiments, other communications devices may be associated with the user 105.

The communications network 125 comprises any communications network which may convey the call from the originating communications device 120 to the destination communications device. The communications network 125 may comprise a point to point communications network, including but not limited to the PSTN, a packet based communications network, including but not limited to the internet, a wireless communications network, including but not limited to a cell network, a WiFi network, and/or a WiMax network, or a combination thereof. In some embodiments the communications network 125 may comprise a plurality of communications networks. In any event, the communications network 125 comprises at least one switching element 128 for switching the call to the destination communications device. The at least one switching element 128 may comprise a PBX switch, a server for relaying IP packets to the destination device, a mobile phone telephone exchange, or a combination thereof. The communications network 125 may comprise further apparatus for establishing the first connection 124 and establishing another connection to switch the call to the destination communications device, for example third connection 121.

When the call is initiated, a first connection 124 is established between the originating communication device 120 and the at least one switching element 128. The first connection 124 may comprise a physical connection, or a virtual connection, as known to one of skill in the art. When the connection is established, data 123 associated with the call is transmitted to the at least one switching element 128 via the first connection 124. In one non-limiting embodiment, the data 123 comprise an identifier of the destination communication device for which the call is intended, for example a phone number, network address, an alias, an identifier of the user 105, or a combination thereof. In another non-limiting embodiment, the data 123 may further comprise an identifier of the originating communications device 120, for example the caller line ID (CLID), a network address, an alias an identifier of the caller 106, or a combination thereof.

Based on the data 123, the at least one switching element 128 is further enabled to determine if the call is intended for a user who subscribes to services available through an applications server 130, the applications server 130 enabled for providing telephony services to users, for example user 105. In one non-limiting embodiment, a record (not depicted) of an association between an identifier of the destination communication device for which the call is intended and the user 105 is stored at the at least one switching element 128, or another element within the communications network 125 with which the at least one switching element 128 is in communication (for example a telephony database). Within the record, an association between the user 105 and the application server 130 is also stored, to indicate that the user 105 is a subscriber to services available at the applications server 130. Hence, the at least one switching element 128 is enabled to determine that the user 105 is a subscriber to services available at the applications server 130, via a lookup in the record.

If the user 105 is a subscriber to services available at the applications server 130, in some embodiments the at least one switching element 128 is further enabled to connect the originating communications device 120 to the applications server 130 via a second connection 126, similar to the first connection 124. In these embodiments, data 129 associated with the call is transmitted to the applications server via the second connection 126. The data 129 comprises at least a subset of the data 123, data derived from the record, or a combination thereof. In other embodiments, the at least one switching element 128 is enabled to signal the applications server 130 that a call intended for a destination communications device associated with a subscriber to services at the applications server 130 has arrived at the at least one switching element 128, for example by transmitting a signal comprising the data 129 to the applications server 130.

In a non-limiting example, the data 129 may comprise the address of the destination device to which the call was directed, for example a telephone number, a network address, an alias, or an identifier of the user 105. An identifier of the user 105 may comprise a name of user 105, a customer number of the user 104, a street address of the user 105, and the like. In some embodiments, the data 129 may further comprise an identifier of the call, for example the caller line ID (CLID) of the call, an identifier of the caller 106, an alias of the originating communications device 120, or a combination thereof.

The applications server 130 comprises an interface 134 for enabling the applications server 130 to communicate with the communications network 125. The applications server 130 further comprises at least one telephony applications module, the at least one telephony applications modules for providing a telephony service to the user 105. In particular, the applications server 130 comprises a delayed answer module 136 for effecting a delayed answer feature, to allow a user extra time to pick up an incoming call, described in detail below with reference to FIG. 2. In other embodiments, the applications server 130 may further comprise a voicemail module 135. In yet other embodiments, the applications server 130 may comprise a web server 138 for enabling the user 105 to communicate with the applications server 130. In some non-limiting embodiments, the applications server 130 comprises the Mitel Applications Suite produced by Mitel, 350 Legget Drive, Kanata, Ontario, Canada K2K 2W7.

In some embodiments, the applications server 130 further comprises a user profile 132 for storing data associated with the user 105. In particular, the user profile 132 comprises data to indicate if the user 105 has subscribed to a delayed answer feature available via the delayed answer module 136. In these embodiments, the user profile 132 may comprise a table T2 for storing an indication of whether the Delayed Answer Feature is turned on or off. The user 105 may enable the Delayed Answer Feature via a provisioning step, described below. For example, in a non-limiting embodiment, the table T2 may comprise:

| Identifier of User 105 Delayed Answer Feature | |
|---|---|
| On | X |
| Off | |

In this embodiment, the table T2 further comprises an identifier of the user 105. The identifier of the user may comprise an address of a destination communications device associated with the user 105, for example a telephone number, a network address, or an alias of the telephone number or the network address, and the like, or an identifier of the user 105, for example a name of user 105, a customer number of the user 105, a street address of the user 105, and the like.

Hence, the applications server 130 may determine if a state of the user 105 comprises the user 105 being available to receive an incoming call, but requiring extra time to pick up an incoming call using a destination communications device, by consulting the table T2. As the user 105 turns the delayed answer feature on or off, the state of the delayed answer feature as stored in the table T2 is indicative of the state of the user 105.

In another non-limiting embodiment, the table T2 may comprise:

| Identifier of User 105 | | | |
|---|---|---|---|
| Destination Communications Device Address | Destination Communications Device Alias | Subscribed Services | Delayed Answer Feature |
| 416 555 1212 | Home | Delayed Answer | On X |
| 416 555 1234 | Office | Voicemail | Off |
| 416 555 1235 | Mobile | | |

In this embodiment, the table T2 further comprises a list of services available through the applications server 130 to which the user 105 has subscribed. The table T2 further comprises the addresses of the destinations communications devices with which the user 105 is associated, as well as their associated aliases.

In some embodiments, the applications server 130 further comprises a plurality of user profiles, each of the plurality of user profiles similar to the user profile 132, as described below. In these embodiments, each of the plurality of user profiles is associated with a different user, for example one for each customer of a provider of the system depicted in FIG. 1.

In other embodiments, the applications server 130 may be enabled to communicate with a presence server 140 to determine if a state of the user 105 comprises the user 105 being available to receive an incoming call, but requiring extra time to pick up an incoming call using a destination communications device. In these embodiments, the presence server 140 comprises a user state profile 142 associated with the user 105, the user state profile 142 for indicating a state of the user 105. In some embodiments, the presence server 140 further comprises a plurality of user state profiles, each of the plurality of user state profiles similar to the user state profile 142, as described below. In these embodiments, each of the plurality of user state profiles is associated with a different user, for example one for each customer of a provider of the system depicted in FIG. 1.

In some embodiments, the user state profile 142 comprises a table T1, the table T1 for storing an indication if the Delayed Answer Feature is turned on or off, similar to that described above with reference to the table T2. In some embodiments, the table T1 further comprises an additional list of potential states of the user 105, and the current state of the user 105. In one non-limiting example, the table T1 comprises:

| Identifier of User 105 | | | |
|---|---|---|---|
| Potential States | Current State Indicator | State Address | Delayed Answer Feature |
| Home | | 416 555 1212 | On  X |
| Office | | 416 555 1234 | Off |
| Mobile | X | 416 555 1235 | |
| Busy | | VoiceMail | |
| Away | | VoiceMail | |
| Asleep | | VoiceMail | |
| Vacation | | VoiceMail | |

Hence T1 comprises a list of Potential States which, in some embodiments, may be registered by the user 105 in a provisioning step described below. In some embodiments, a potential state comprises a potential location of the user 105, for example Home, Office, or Mobile. In general, each location will be associated with a destination communications device. For example, the Mobile location may be associated with the mobile communications device 110, and the Office location may be associated with the wireline communications device 112. In some embodiments, the association between each location and a destination communications device is stored in Table T1. For example, in the depicted non-limiting embodiment, in rows in T1 which comprise a location and an associated state address, the state address is indicative of a location associated with a destination communications device. In other embodiments, the association between each location and a destination communications device is stored in Table T2. In these embodiments, rows in T2 may comprise a location and the address of an associated destination communications device. Returning to T1, in other embodiments, the potential state may comprise a potential status of the user 105, for example Busy, Away (from a communications device), on Vacation, or Asleep. In other embodiments, other potential states may be stored in T1.

The table T1 further comprises an identifier of the user 105, similar to the identifier of the user stored in Table T2. The table T1 further comprises a Current State Indicator to indicate the current state of the user 105 in the list of Potential States. In some embodiments, the Current State Indicator may be set by the user 105 via a current state update step, described in more detail below. In these embodiments, the Delayed Answer Feature may be turned on and off during the current state update step. In other embodiments, the Current State Indicator may be set by an interaction of the presence server 140 with at least one communications device associated with the user 105, or at least one sensor associated with the user 105, as known to one of skill in the art. In any event, the Current State Indicator indicates the current state of the user 105, whether location or status or another state, with the current state of the user 105 indicated as "Mobile" in the depicted embodiment.

In other embodiments of the table T1, the state of the user 105 being available, but requiring extra time to pick up an incoming call using a destination communications device, may be indicated in other ways. In some non-limiting embodiments, the list of Potential States may comprise a state for each potential location, and a state for each potential location where the user 105 may require extra time to pick up an incoming call. For example, the list of Potential States may comprise a "Mobile" potential state, and a "Mobile-Delayed Answer" potential state. In other embodiments, the list of Potential States may further comprise a "Mobile-Walking" potential state, and a "Mobile-Vehicle" potential state. If the state of the user 105 comprises the Mobile-Walking state, the user 105 may not require extra time to pick up an incoming call using a destination communications device. However if the state of the user 105 comprises the Mobile-Vehicle state, the user 105 may require extra time to pick up an incoming call using a destination communications device.

In some embodiments, the table T1 further comprises a list of actions, each action associated with at least one of the potential states, and each action indicating the action that is to be taken if an incoming call intended for the user 105 is detected, for example by at least one switching element 128. In other embodiments, the table T2 comprises the list of actions. In some embodiments, the list of actions comprises a list of addresses of each destination communications device associated with each location. In some embodiments, the address of each destination communications device may comprise a telephone number, a network address (e.g. an IP address), an alias of a telephone number or a network address, or a combination thereof. In these embodiments, the presence of the address of a destination communications device in the list of actions indicates that, if the Current State Indicator shows that the state of the user is the location with which the address of the destination communications device is associated, incoming calls intended for the user 105 are to be conveyed to that address. In other embodiments, the list of actions comprises a VoiceMail indicator for indicating that, if the Current State Indicator shows that the state of the user is a status with which the Voicemail indicator is associated, incoming calls intended for the user 105 are to be conveyed to VoiceMail.

Figure 2:
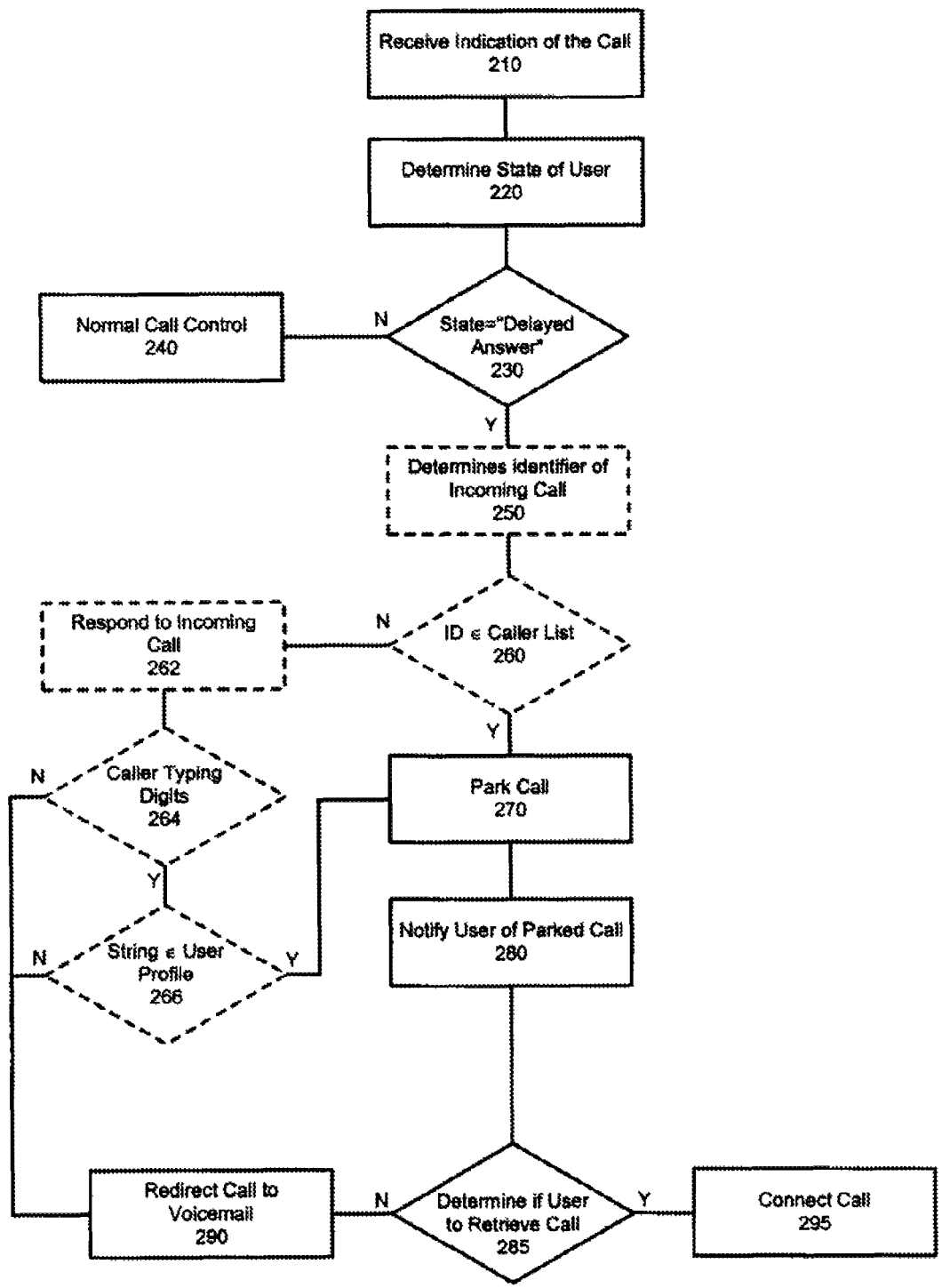
FIG. 2 depicts a method for managing a call from an originating communications device associated with a caller, to a destination communications device associated with a user, according to a non-limiting embodiment.

Turning now to FIG. 2, which depicts a method for managing a call from the originating communications device 120 associated with the caller 106, to a destination communications device associated with the user 105, the call intended for the user 105. The method of FIG. 2 may be executed at the applications server 130.

At step 210, an indication of the call is received at the applications server 130. In one non-limiting embodiment, the indication of the call is received via the establishment of the second connection 126. In another non-limiting embodiment, the indication of the call is received via the data 129 arriving at the applications server 130. The data 129 enables the applications server 130 to identify the user 105, and to further identify if the state of user 105 comprises the user 105 being available to receive a call, but requiring extra time to pick up the call using a destination communications device.

The applications server 130 then determines the state of the user 105 at step 220. Specifically, the applications server 130 determines whether the state of the user 105 comprises the user 105 being available to receive a call, but requiring extra time to pick up a call using a destination communications device. In some embodiments, the applications server 130 may determine the state of the user 105 by consulting the user profile 132 to determine if the Delayed Answer Feature is turned on or off (or whether the user 105 is even a subscriber to this service). In other embodiments, the applications server 130 may determine the state of the user 105 by transmitting a query 144 to the presence server 140, the query 144 for triggering a look up of the state of the user 105 at the presence server 140. In these embodiments, the query 144 comprises an identifier of the user 105, which may be processed by the presence server 140 to lookup the state of the user 105. In these embodiments, the presence server 140 transmits a response 145 to the query 144 from the applications server 130, the response 145 comprising the state of the user 105, in particular whether the state of the user 105 comprises the user 105 being available to receive a call, but requiring extra time to pick up the call using a destination communications device. In some embodiments, the response 145 may further comprise state information associated with the user 105, for example a location or a status of the user 105.

At step 230, the applications server 130 determines whether the state of the user 105 comprises a delayed answer state, in that the user 105 is available to receive a call, but requires extra time to pick up the call using a destination communications device. If the state of the user 105 is not a delayed answer state, the applications server 130 reverts to normal call control 240. In some embodiments, normal call control may comprise transmitting a signal to the at least one switching element 128 to connect the call to the requested destination device, signalling to the at least one switching element 128 to connect the call with voicemail, for example the voicemail module 135, internally routing the second connection 126 to the voicemail module 135 if the second connection 126 is already established, perform a presence lookup at the presence server 140, if not already performed, to determine the location or status of the user 105 to direct the call accordingly, or a combination of the above.

In some embodiments, the state of the user 105 may comprise the user 105 being available to receive the call, only if the call is from a select group of callers, but requires extra time to pick up the call using a destination communications device. In these embodiments, the applications server 130 determines an identifier of the call at step 250, by processing the data 129 to determine, for example, the CLID of the call, an identifier of the caller 106, an alias of the originating communications device 120, or a combination thereof.

In these embodiments, the applications server 260 then determines if the identifier of the call, determined at step 250, is an element of a caller list CL, the user profile 132 comprising the caller list CL. In these embodiments, the user 105 may wish to implement the delayed answer feature only for select callers, for example select family members, select friends, or select business colleagues. Hence, the caller list comprises a list of callers whom the user 105 has authorized to trigger the delayed answer feature. In one non-limiting embodiment, the caller list CL comprises:

| Caller | Address | Access Code |
|--------|---------|-------------|
| Bob | 416-555-4321 | 1234 |
| Jane | 416-555-1212 | 1235 |
| Sadie | 212-555-6438 | 1236 |

The "Caller" column comprises an identifier of a select caller, for example the name of a select caller. The "Address" column comprises an identifier of a communications device associated with the select caller, for example a phone number or a network address of the originating communications device 120.

In some embodiments, the caller list CL may further comprise an "Access Code" column, comprising an access code assigned to the select caller, the access code assigned to the select caller for enabling the select caller to trigger the delayed answer feature from a communications device which is not associated with the select caller.

In other embodiments, the user profile 132 may further comprise an access code associated with the user 105, the access code associated with the user 105 for enabling a select caller in possession of the access code associated with the user 105 to trigger the delayed answer feature from the originating communications device 120. Embodiments which make use of an access code will be described below with reference to steps 264 and 266 of FIG. 2.

If the identifier of the call is an element of the caller list CL, at step 270 the call is parked. In some embodiments, the applications server 130 parks the call by transmitting a signal 146 to the at least one switching device 128. In some embodiments, the signal 146 is enabled to trigger the at least one switching device 128 to place the call hold. In other embodiments, the signal 146 is enabled to trigger the at least one switching device 128 to route the call to the applications server 130, where the call is connected to the delayed answer module 136. In these embodiments, the delayed answer module 136 is enabled to play a message via the call to inform the caller 106 that a delayed answer feature is being implemented. In a non-limiting example, the message may inform the caller 106 that the user 105 is available, is being notified of the call, and will retrieve the call shortly.

At step 280, the user 105 is notified of the call, and that the call has been parked for retrieval. In one non-limiting embodiment, the delayed answer module 136 generates and transmits a notification 147 via the communication network 125 to the destination communications device (for example the mobile communications device 110, as depicted) for which the call was intended. In other embodiments, for example embodiments which comprise determining the state of the user 105 by transmitting a query 144 to the presence server 140, and the response 145 comprising a location of the user 105, the notification 147 may be transmitted to a destination communications device at the present location of the user 105. For example, the call may have been intended for the wired communications device 112, however the user 105 has changed his state to a mobile state via an interaction with the presence server 140, described below. In these embodiments, the notification 147 is transmitted to the mobile communication device 110.

The notification 147 comprises data for notifying the destination communications device of the call, and that the call has been parked for retrieval. In one non-limiting embodiment, the notification 147 may comprise an identifier of the call. In another non-limiting embodiment, the notification 147 may comprise an identifier of the caller 106 associated with the originating communications device. In some of these embodiments, the identifier of the caller 106 may be determined by consulting the caller list CL prior to generating the notification 147.

In some embodiments, the destination communications device may be configurable to respond in a specific manner when the notification 147 is received. In a non-limiting example, the destination communications device may be configured to vibrate and/or play an audible notification associated with the delayed answer feature, when the notification is received. In another non-limiting example, the destination communications device may be configured to display a message on a display unit that is an element of the destination communications device, the message for informing the user 105 of the call, and that the call is parked for retrieval. In these embodiments, the message may comprise an identifier of the call and/or an identifier of the caller 106.

At step 285, the application server 130 determines if the user 105 will retrieve the call. In one non-limiting embodiment, the user 105 triggers the destination communications device to return a signal (not depicted) to the applications server 130 indicating whether the user 105 will retrieve the call, for example by entering a command into the destination communications device via keypad or a button. In these embodiments, the applications server determines if the user 105 will retrieve the call by processing the signal. In other embodiments, the user 105 may ignore the notification 147. In these embodiments, the applications server 130 may determine if the user 105 will retrieve the call by measuring the time for the user 105 to respond to the notification 147. If the time exceeds a reference time, the applications server 130 may determine that the user 105 will not retrieve the call.

If the applications server 130 determines at step 285 that the user 105 will not retrieve the call, the call may be redirected to voice mail at step 290, for example by triggering the at least one switching element 128 to connect the call to the voice mail module 135. If however the applications server 130 determines at step 285 that the user 105 will retrieve the call, the applications server 130 may transmit a signal to the at least one switching element 128 to connect the call to the destination communications device. In these embodiments, the at least one switching element 128 then establishes the third connection 121, and switches the call to the destination communications device. The second connection 126 may then be dropped.

Returning now to embodiments that comprise a caller list CL stored at the user profile 132, at step 260 the applications server 130 may determine that the identifier of the call, determined at step 250, is not an element of a caller list CL. In these embodiments, the applications server 130 may then trigger the at least one switching element 128 to respond to the call in the usual fashion at step 262. In one non-limiting example, the at least one switching element 128 may attempt to connect the call to the destination communications device. In another non-limiting embodiment, the at least one switching element 128 may redirect the call to voicemail, for example by triggering the at least one switching element 128 to connect the call to the voice mail module 135. In these embodiments, the voice mail module 135 may convey a message to the caller 106, via the call that is now connected to the voice mail module 135, that the user 105 is unavailable and further inquire if the caller 106 wishes to leave a voice message.

In any event, if the caller 106 has been provided with an access code, as discussed above, the caller 106 may enter the access code into the originating communications device 120, for example but entering the access code into a keypad of the originating communications device 120. In general, the access code may be preceded by an identifier code, which identifies the access code which follows the identifier code, as an access code for accessing the delayed answer feature. In a non-limiting example, the identifier code may comprise a special key on the keypad (e.g. "*" or "#") in combination with an alphanumeric string, for example "#32", or "*32".

Hence, at step 264, the applications server 130 determines if the caller 106 is typing additional digits into the originating communications device 120, for example by detecting DTMF tones transmitted along the call. In embodiments where the call has not been connected to the applications module 130, the at least one switching element 128 may be enabled to detect the identifier code, and respond by transferring the call to the applications module 130 for further determination of the caller 106 typing digits into the originating communications device 120.

If the caller 106 is not typing digits into the originating communications device 120, the applications module 130 connects the call to voicemail at step 290, if the call is not already connected to voicemail. If, however the caller 106 is typing digits into the originating communications device 120, the applications server 130 collects the digits, for example by converting DTMF tones into an alphanumeric string, and then compares the alphanumeric string against the access codes stored at the user profile 132. If the alphanumeric string matches an access code stored at the user profile 132, the applications server 130 triggers the delayed answer feature at step 270, as described above. If not, the applications module 130 connects the call to voicemail at step 290, if the call is not already connected to voicemail.

Provisioning and update steps are now discussed. In some embodiments, the system of FIG. 1, further comprises a browser enabled device 114 for enabling the provisioning and updating of the table 12 and/or the caller list CL and/or the table T1. In these embodiments, the browser enabled device 114 comprises a browser, and may be in communication with the applications server 130 and/or the presence server via the communications network 125 or an alternate communications network 226. In some embodiments, the alternate communications network 226 comprises the internet.

In some embodiments, the browser enabled device 114 comprises a browser enabled personal computer. In other embodiments, the browser enabled device 114 and the destination communications device, for example the wired communications device 114, may be combined in an apparatus 127. In yet other embodiments, the destination communications device may comprise a browser. In any event, the user 105 may use the browser enabled device 114 and/or the destination communications device to provision and update the table T2 and/or the caller list CL and/or the table T1.

Figure 3:
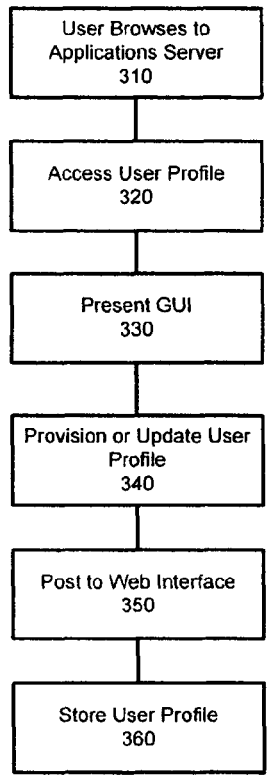
FIG. 3 depicts a method for provisioning and updating the state of a user, according to a non-limiting embodiment.

Turning now to FIG. 3, which depicts a method for provisioning the user profile 132. At step 310 the user 105 browses to the applications server 130 by entering a network address of the applications server 130 into the browser. At step 320, the user 105 accesses the user profile 132 via the web server 138. At step 330, the user 105 is presented with a graphic user interface (GUI) for editing the user profile 132.

Figure 5:
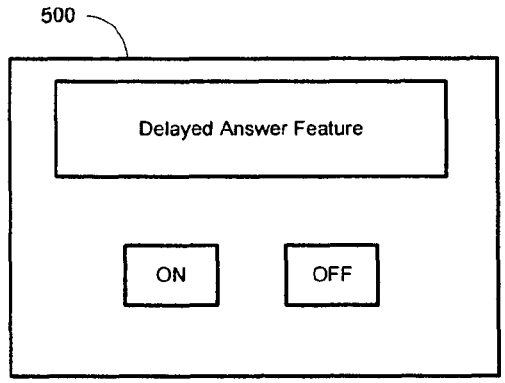
FIG. 5 depicts a graphic user interface for provisioning and updating the state of a user, according to a non-limiting embodiment.
Figure 4:
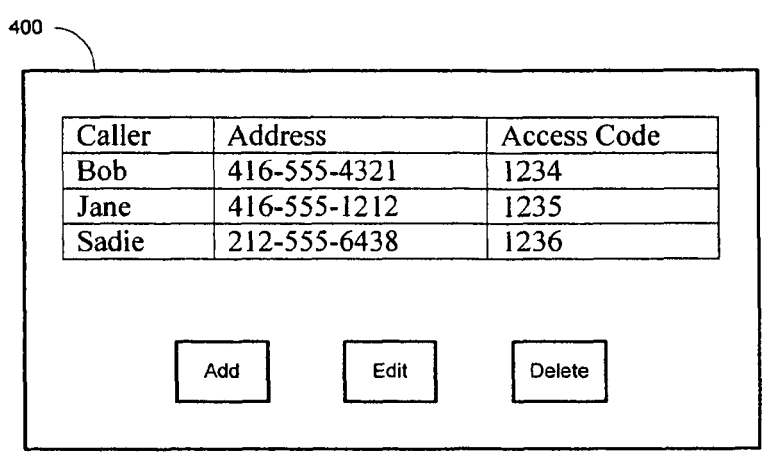
FIG. 4 depicts a graphic user interface for provisioning and updating the state of a user, according to a non-limiting embodiment.

In one non-limiting embodiment, the GUI comprises the GUI 400 depicted in FIG. 4. In these embodiments, the user 105 is presented with the GUI 400 which allows the user 105 to add, edit or delete entries in the caller list CL via "Add", "Edit" and "Delete" buttons, respectively. In another non-limiting embodiment, the GUI comprises the GUI 500 depicted in FIG. 5. In these embodiments, the user 105 is presented with the GUI 500 which allows the user 105 to turn the delayed answer feature on or off, via "ON", and "OFF" buttons, respectively.

At step 340, the GUI is used to provision or update the user profile 132. At step 350 the changes made to the user profile 132 are posted to the web server 138, and at step 360, the web server 138 causes the changes to the user profile 132 are stored at the web interface.

Though not depicted, a method similar to the method depicted in FIG. 3 may be used by the user 105 to provision or update the user state profile 142 at the presence server 140.

Those skilled in the art will appreciate that in some embodiments, the functionality of the applications server 130 and the presence server 140 may be implemented using pre-programmed hardware or firmware elements (e.g., application specific integrated circuits (ASICs), electrically erasable programmable read-only memories (EEPROMs), etc.), or other related components. In other embodiments, the functionality of the applications server 130 and the presence server 140 may be achieved using a computing apparatus that has access to a code memory (not shown) which stores computer-readable program code for operation of the computing apparatus. The computer-readable program code could be stored on a medium which is fixed, tangible and readable directly by these components, (e.g., removable diskette, CD- ROM, ROM, fixed disk, USB drive), or the computer-readable program code could be stored remotely but transmittable to these components via a modem or other interface device connected to a network (including, without limitation, the Internet) over a transmission medium. The transmission medium may be either a non-wireless medium (e.g., optical or analog communications lines) or a wireless medium (e.g., microwave, infrared, free-space optical or other transmission schemes) or a combination thereof.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

I claim:

1. A method for managing a call to a user associated with a destination communications device, the call initiated by a caller at an originating communications device, comprising,
   receiving an indication of the call at an application server, said indication of the call comprising data associated with the user and a connection with the originating communication device via at least one switching element that is connected with the originating communication device;
   determining a state of the user by processing said data associated with the user and consulting a record of the state of the user;
   parking the call by the at least one switching element placing the call on hold if said state of the user comprises a delayed answer state, said delayed answer state comprising the user being available to receive the call, but requiring additional time to retrieve the call using the destination communications device; and
   triggering a notification of the call to the destination communications device by transmitting a signal to an address of the destination communications device notifying the call has been parked for retrieval.

2. The method of claim 1, wherein said parking the call comprises connecting said call with an audible message system for notifying the caller via the originating communications device that the state of user comprises said delayed answer state.

3. The method of claim 2, wherein said notifying the caller comprises transmitting an audible message to the caller.

4. The method of claim 1, further comprising receiving an indication of the user attempting to retrieve the call in response to said triggering said notification, and triggering the connection of the call between the originating communications device and the destination communications device in response to said indication.

5. The method of claim 4, wherein said triggering the connection of the call comprises transmitting a signal to at least one switching device, the at least one switching device for effecting a connection between the originating communications device and the destination communications device.

6. The method of claim 1, further comprising determining an address of the destination communications device to effect said triggering said notification, by processing said data associated with the user.

7. The method of claim 1, further comprising determining an address of the destination communications device to effect said triggering said notification, by consulting a record of the location of the user.

8. The method of claim 7, wherein said record of the state of the user comprises said record of the location of the user.

9. The method of claim 1, wherein said notification of the call to the destination communications device comprises at least one of displaying a message on a display unit associated with the destination communications device, playing an audible notifier, and a vibration of the destination communications device.

10. The method of claim 1, wherein said indication of the call further comprises an identifier of the caller, and further comprising parking the call if said state of the user comprises said delayed answer state, and said identifier of said caller matches a reference identifier.

11. The method of claim 10, wherein said identifier of the caller comprises at least one of a caller line ID of the originating communications device, a network address of the originating communications device, and an alias of the caller.

12. The method of claim 1, wherein said data associated with the user comprises at least one of a phone number of a communication device for which the call is initially intended, a network address of said communication device for which the call is initially intended, and an alias of the user.

13. The method of claim 1, further comprising triggering the connection of the call between the originating communications device and a voicemail system if an indication of the user attempting to retrieve the call in response to said triggering said notification is not received within a defined time period.

14. The method of claim 1, further comprising consulting a record of a current location of the user to determine an address of the destination communications device, a current location of the user associated with said address of the destination communications device.

15. The method of claim 14, wherein consulting a record of a current location of the user to determine an address of the destination communications device comprises
   transmitting a request for said current location of the user to a presence server, said presence server for storing said record of a current location of the user;
   receiving said current location of the user in response to said request; and
   consulting a list of destination communication devices associated with the user using said location.

16. The method of claim 1, further comprising receiving an access code and parking the call if said state of the user comprises said delayed answer state, and said access code matches a reference access code.

17. The method of claim 1, further comprising receiving an indication of said state of the user from a communications device.

* * * * *